(12) United States Patent
Li et al.

(10) Patent No.: US 11,120,308 B2
(45) Date of Patent: Sep. 14, 2021

(54) VEHICLE DAMAGE DETECTION METHOD BASED ON IMAGE ANALYSIS, ELECTRONIC DEVICE AND STORAGE MEDIUM

(71) Applicant: Ping An Technology (Shenzhen) Co., Ltd., Shenzhen (CN)

(72) Inventors: Kun Li, Santa Clara, CA (US); Hao Zhang, Redwood City, CA (US); Ruei-Sung Lin, Redwood City, CA (US); Mei Han, Palo Alto, CA (US)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 40 days.

(21) Appl. No.: 16/726,790

(22) Filed: Dec. 24, 2019

(65) Prior Publication Data
US 2021/0192264 A1 Jun. 24, 2021

(51) Int. Cl.
*G06K 9/62* (2006.01)
(52) U.S. Cl.
CPC ............ *G06K 9/627* (2013.01); *G06K 9/6256* (2013.01)

(58) Field of Classification Search
None
See application file for complete search history.

(56) References Cited

U.S. PATENT DOCUMENTS

2020/0089990 A1* 3/2020 Xu .............................. G06T 7/11
2020/0104940 A1* 4/2020 Krishnan ............... G06Q 40/08

* cited by examiner

Primary Examiner — Leon Flores
(74) Attorney, Agent, or Firm — ScienBiziP, P.C.

(57) ABSTRACT

A vehicle damage detection method based on image analysis, an electronic device, and a storage medium are provided. In the vehicle damage detection method, query images are obtained by filtering received images through a pre-trained Single Shot MultiBox Detector (SSD) object detection model, and a feature vector of each of the query images is obtained by inputting each of the query images into a residual network. Target output data is obtained using a Transformer model, similar images of the query images are obtained by processing the target output data using a pre-trained similarity judgment model. Loss of a current vehicle damage assessment case is evaluated based on similar cases, and evaluated loss is outputted. By utilizing the vehicle damage detection method, effectiveness of the vehicle damage detection is improved, and automatic evaluation of a loss is achieved.

17 Claims, 3 Drawing Sheets

VEHICLE DAMAGE DETECTION METHOD BASED ON IMAGE ANALYSIS, ELECTRONIC DEVICE AND STORAGE MEDIUM

FIELD

The present disclosure relates to technology field of image processing, and particularly to a vehicle damage detection method based on image analysis, an electronic device and a storage medium.

BACKGROUND

At present, vehicle damage assessment is performed manually. For example, an assessment engineer performs a manual damage determination according to an investigation of a scene of traffic accident.

Damage pattern of vehicles is complicated, and a similarity of photos of damage to vehicles with same damaged parts and same damage types is low, thus it is difficult to obtain a good prediction result. In addition, in a vehicle damage case with a large amount of impairment, some components have been damaged and caused to be lost, thus the prediction, result may not be accurate. It is also difficult to directly estimate repair cost using the prediction result.

DETAILED DESCRIPTION

In order to make objects, technical solutions and advantages of a present disclosure more comprehensible, the present disclosure is described in detail below with references to drawings and specific embodiments.

Figure 1:
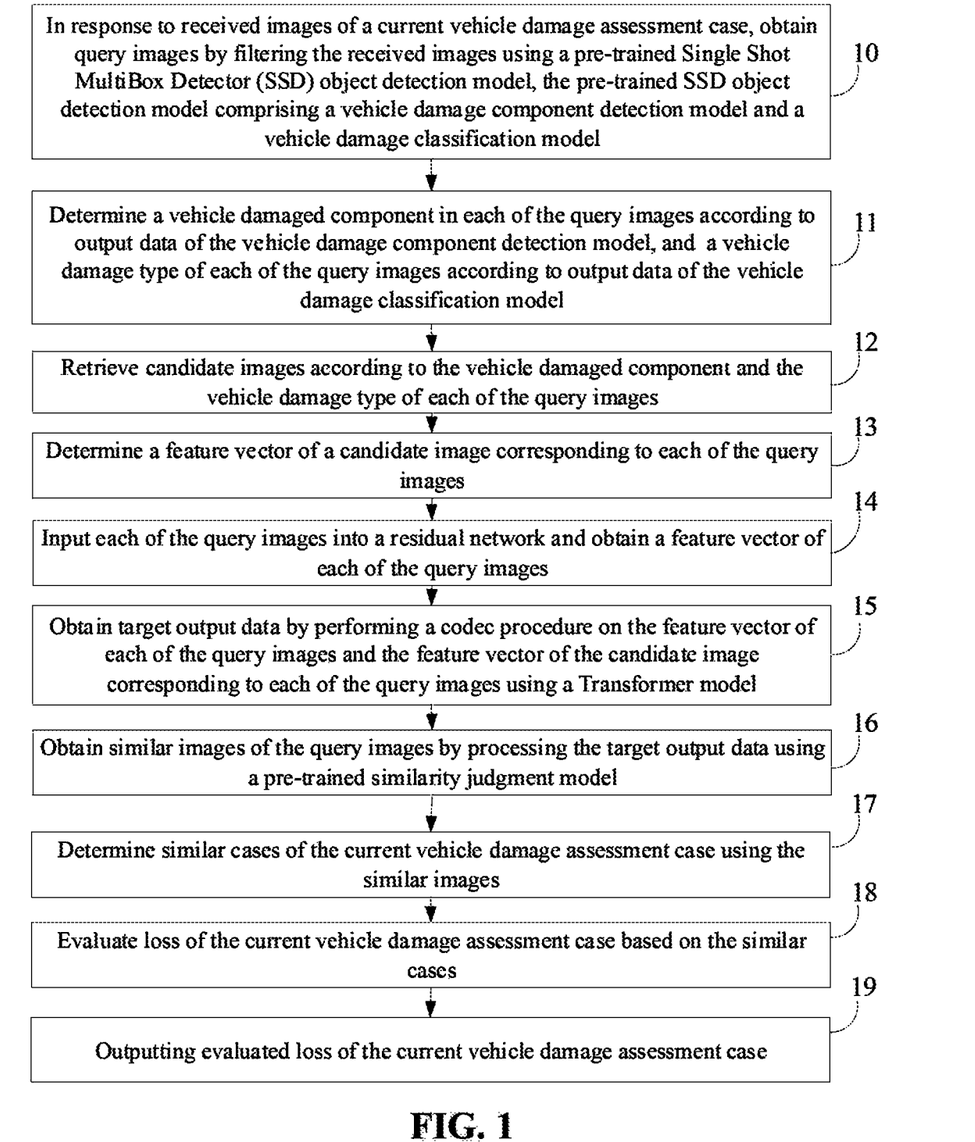
FIG. 1 is a flowchart of an embodiment of a vehicle damage detection method based on image analysis.

FIG. 1 is a flowchart of an embodiment of a vehicle damage detection method based on image analysis. According to different requirements, an order of blocks in the flowchart can be changed, and some blocks can be deleted.

The vehicle damage detection method based on image analysis can be applied to one or more electronic devices. An electronic device can automatically perform numerical calculation and/or information processing according to an instruction configured or stored in advance, and hardware of the electronic device can include, but is not limited to, a microprocessor, an Application Specific Integrated Circuit (ASIC), a Field-Programmable Gate Array (FPGA), a Digital Signal Processor (DSP), and an embedded device, etc.

The electronic device can be any electronic product that can interact with users, such as a personal computer, a tablet computer, a smart phone, a personal digital assistant (PDA), a game machine, an Interactive Network Television (IPTV), and smart wearable devices, etc.

The electronic device can also be a network device and/or user equipment. The network device can include, but is not limited to, a single network server, a server group including a plurality of network servers, or a cloud computing system including a plurality of hosts or network servers.

The electronic device can be connected to a network. The network can include, but is not limited to, the Internet, a wide region network, a metropolitan region network, a local region network, a virtual private network (VPN), and the like.

At block 10, in response to received images of a current vehicle damage assessment case, an electronic device obtains query images by filtering the received images using a pre-trained Single Shot MultiBox Detector (SSD) object detection model, the pre-trained SSD object detection model includes a vehicle damage component detection model and a vehicle damage classification model.

In one embodiment, the received images may be transmitted by a user (e.g., a relevant staff member), who captures images at a scene where the current vehicle damage assessment case occurs, such as a traffic accident scene.

For example, in a vehicle damage assessment case, images are captured by an automobile risk assessment engineer or an inspector of a traffic accident, and then the images are transmitted to the electronic device for performing the vehicle damage detection method based on analysis of received images. In another example, a vehicle owner may invoke a vehicle risk determination application program in a mobile terminal, then the vehicle owner may take photos and upload the photos to be evidence according to requirement of vehicle insurance in the vehicle risk determination application program.

In one embodiment, each vehicle damage assessment case may include a plurality of images, such as more than 20 images.

In one embodiment, the received images further include an image of an identity of an owner of a vehicle, and an image of a vehicle identification number (VIN) code that indicates, vehicle information. Images taken inside the vehicle may cause image quality to be low due to lighting problems. Such low-quality images may influence a detection result. Therefore, in order to eliminate interferences of irrelevant images, the received images need to be filtered.

In one embodiment, the electronic device may filter the received images using the pre-trained SSD object detection model.

After filtering, the number of the query images may be smaller than the number of the received images. For example, when the number of the received images is 20, the number of the query images may be 2-5. The number of the query images depends on a filtering result.

In one embodiment, a vehicle damaged component can be determined by the vehicle damage component detection model, and a vehicle damage type can be determined by the vehicle damage classification model.

The vehicle damage component detection model and the vehicle damage classification model may be SSD object detection models.

In one embodiment, output data of the vehicle damage component detection model may include a name or an identifier of a vehicle damaged component, and output data of the vehicle damage classification model may include an identifier of a vehicle damage type.

At block 11, the electronic device determines a vehicle damaged component in each of the query images according to the output data of the vehicle damage component detection model, and a vehicle damage type of each of the query images according to the output data of the vehicle damage classification model.

In one embodiment, a type of the vehicle damage component and a type of the vehicle damage type can be predefined or updated according to actual requirements.

For example, the electronic device can classify the vehicle damaged component into one or more of following categories, including a rear bumper, a rear cover, a front bumper, a front cover, a left rear door, a left rear fender, a left bottom, a left front door, a left front fender, a right rear door, a right rear fender, a right car bottom, a right front door, a right front fender, and a roof. The electronic device can further classify the vehicle damage type into following predefined categories, including respraying, repairing, and renewing.

At block 12, the electronic device retrieves candidate images according to the vehicle damaged component and the vehicle damage type of each of the query images.

In one embodiment, the electronic device may firstly generate a search vector according to the vehicle damaged component and the vehicle damage type of each of the query images, then the electronic device may retrieve the candidate images by performing a search in a configuration database using the search vector.

The configuration database may store images of all historical cases in relation to vehicle damage assessments.

At block 13, the electronic device determines a feature vector of a candidate image corresponding to each of the query images.

In one embodiment, before determining the feature vector of the candidate image corresponding to each of the query images, the electronic device may input each candidate image into the residual network, and obtain a first vector of the each candidate image. Then the electronic device may process the first vector using a Transformer model, that is, the electronic device may encode the first vector using the Transformer model. The electronic device may obtain the feature vector of the each candidate image, and store the feature vector of the each candidate image into the configuration database.

According to the above embodiments, the electronic device directly stores the feature vector of the each candidate image in the configuration database, instead of only storing each candidate image. Thus the feature vector can be directly invoked when needed. Time consumption caused of regenerating the feature vector by data processing can be avoided every time the feature vector is used. Thus efficiency of vehicle damage detection based on image analysis can be improved.

At block 14, the electronic device inputs each of the query images into a residual network and the electronic device obtains a feature vector of each of the query images.

In one embodiment, when the query images need to be recognized by a model, the electronic device may convert the query images into a vector form. The vector form is more advantageous for data processing.

In one embodiment, the residual network has a skip connection structure. Through the skip connection structure, a gradient can be better transmitted from an output to an input when training a model. Training of the model is easier and training effect of a residual network model is better. Therefore, the electronic device may process each of the query images using the residual network, and the electronic device may obtain the feature vector of each of the query images.

At block 15, the electronic device obtains target output data by performing a codec procedure on the feature vector of each of the query images and the feature vector of the candidate image corresponding to each of the query images using a Transformer model.

Instead of separately processing the query images and the candidate image, the electronic device may comprehensively process the feature vector of each of the query images and the feature vector of the candidate image corresponding to each of the query images using the Transformer model, and obtain the target output data. Since environmental factors are fully taken into consideration, based on the target output data, related images more similar to the query images can be obtained to be similar images, and non-related images not similar to the query images can be removed. Accuracy of a result of the vehicle damage detection based on the image analysis is higher.

At block 16, the electronic device obtains similar images of the query images by processing the target output data using a pre-trained similarity judgment model.

Since the number of the candidate images that are retrieved may be very large (e.g., tens, or hundreds), the electronic device needs to further filter the candidate images, and obtain candidate images, which are the most similar to each of the query images, as the similar images.

Specifically, the electronic device may process the target output data according to the similarity judgment model, and obtain the similar images of each of the query images. Thus, the similar images are more accurate, and redundant data with lower similarity is further eliminated.

In one embodiment, before processing the target output data using the pre-trained similarity judgment model, the electronic device may train the similarity judgment model, according to a procedure as provided below.

The electronic device obtains training samples, and constructs a plurality of sets of training data according to the training samples. The electronic device may obtain the similarity judgment model by training a prototype network based on a cross entropy loss function based on the plurality of sets of training data.

According to the above embodiments, the electronic device may use the prototype network to obtain the similarity judgment model, and further determine the similar images of each of the query images.

Optionally, the training samples correspond to a plurality of vehicle damage types, each of the plurality of vehicle damage types corresponds to a plurality of images. In an example as provided below, the electronic device constructs the plurality of sets of training data according to the training samples.

The electronic device randomly selects a first preset number of vehicle damage types from the plurality of vehicle damage types to be target vehicle damage types, and constructs an initial image set based on images corresponding to the target vehicle damage types. For each of the target vehicle damage types the electronic device randomly selects a second preset number of images from a plurality of images corresponding to each of the target vehicle damage types. The electronic device further obtains a candidate image set by integrating selected images, and excludes the candidate image set from the initial image set. Then, an image can be randomly acquired as a predicted image from the initial image set after being excluded. In one embodiment, the image can be any image in the initial image set after excluding the candidate image set. The electronic device determines a combination of the predicted image and the candidate image set as a set of training data.

For example, when the training samples correspond to 90 vehicle damage types, and each of the 90 vehicle damage types includes at least 5 images, the electronic device randomly selects 20 vehicle damage types from the 90 vehicle damage types to be 20 target vehicle damage types. The electronic device constructs an initial image set based on images included in the 20 target vehicle damage types. Thus, the initial image set includes at least 100 images. For each of the target vehicle damage types, the electronic device may randomly select 4 images from the at least 5 images included in each of the target vehicle damage types. The electronic device integrates all selected images, and obtains a candidate image set having 80 images. In the initial image set that includes the at least 100 images, the electronic device may further randomly acquire any image as a predicted image from the initial image set, from which the 80 images of the candidate image set are excluded. The electronic device may determine a combination of the predicted image and the candidate image set as a set of training data.

During training, the electronic device may determine a distance between a feature vector of the predicted image and a feature vector of each of the target vehicle damage types, and a vehicle damage level of the predicted image.

In one embodiment, the electronic device determines a feature vector of each image in the second preset number of images corresponding to each of the target vehicle damage types. The electronic device calculates, a vector sum of the feature vector of each image, and obtains a feature vector of each of the target vehicle damage types. The electronic device determines a feature vector of the predicted image, and calculates a distance between the feature vector of the predicted image and the feature vector of each of the target vehicle damage types. The electronic device determines a target vehicle damage level corresponding to a minimum distance to be a vehicle damage level of the predicted image.

Specifically, the distance may include, but is not limited to, Euclidean distance and cosine distance, etc.

For example, in the candidate image set, the electronic device determines a feature vector of each of the 4 images included in each of the target vehicle damage types, calculates a vector sum of the feature vector of each image, and obtains a feature vector of each of the target vehicle damage types. The electronic device further determines a feature vector of the predicted image, and calculates a distance between the feature vector of the predicted image and the feature vector of each of the target vehicle damage types. The electronic device determines a target vehicle damage level corresponding to a minimum distance to be a vehicle damage level of the predicted image.

In one embodiment as provided below, the electronic device obtains the similar images of the query images by processing the target output data using the pre-trained similarity judgment model.

For each of the query images, the electronic device obtains a first embedded vector of the query image from the target output data, and a second embedded vector of the candidate image corresponding to the query image. The electronic device calculates a distance between the first embedded vector and each second embedded vector, and determines candidate images those have second embedded vectors corresponding to a minimum distance, as the similar images of the query images.

According to the above embodiment, the electronic device can determine the similar image of each of the query images based on the distance.

At block 17, the electronic device determines similar cases of the current vehicle damage assessment case using the similar images.

In one embodiment, the similar cases represent cases which have attributes similar to the current vehicle damage assessment case, the similar cases and the current vehicle damage assessment case have the same values of a predetermined number of attributes. Based on the similar cases, a current solution of the current vehicle damage assessment case can be determined.

In one embodiment, the electronic device determines a vehicle damage assessment case corresponding to each of the candidate images, and calculates the number of candidate images corresponding to each vehicle damage assessment case.

In one embodiment, the electronic device determines vehicle damage assessment cases corresponding to a maximum number, to be the similar cases of the current vehicle damage assessment case.

In response that there are a plurality of vehicle damage assessment cases having a same number, the electronic device calculates a sum of distances between the candidate images of each vehicle damage assessment case and a corresponding query image, and determines a vehicle damage assessment case corresponding to a minimum sum to be the similar cases of the current vehicle damage assessment case.

The above embodiment adopts a voting method procedure, which is equivalent to taking one vote for each candidate image. Cases with a largest number of votes can be further determined to be the similar cases of the current vehicle damage assessment case. When there are a plurality of vehicle damage assessment cases having same number of votes, the electronic device may determine vehicle damage assessment case corresponding to a minimum sum to be the similar cases of the current vehicle damage assessment case, to improve accuracy.

At block 18 the electronic device evaluate loss of the current vehicle damage assessment case based on the similar cases.

In one embodiment, the electronic device evaluates the loss of the current vehicle damage assessment case based on the similar cases by utilizing a combination of one or more of the following means:

In response that there is one similar case, the electronic device determines loss of the one similar case to be loss of the current vehicle damage assessment case.

For example, when assessing damage of a vehicle, the electronic device may directly determine the loss of the one similar case to be the loss of the current vehicle damage assessment case.

In response that there are a plurality of similar cases, the electronic device obtains loss of each of the plurality of similar cases, and calculates an average value of obtained loss to be the loss of the current vehicle damage assessment case.

For example, when assessing damage of a vehicle, the electronic device may calculate an average value of the loss of each of the plurality of similar cases, and determine the average value to be the loss of the current vehicle damage assessment case.

In response that there are the plurality of similar cases, the electronic device obtains the loss of each of the plurality of similar cases and a weight of each of the plurality of similar cases. The electronic device calculates a weighted sum of the loss of each of the plurality of similar cases, and determines the weight of each of the plurality of similar cases as the loss of the current vehicle damage assessment case.

For example, when assessing damage of a vehicle, a weight of a similar case A is x, loss of the similar case A is y, a weight of a similar case B is in, and loss of the similar case B is n, then loss of the current vehicle damage assessment case is xy+mn.

In response that there are the plurality of similar cases, the electronic device obtains the loss of each of the plurality of similar cases. The electronic device further obtains maximum loss and minimum loss, and determines a data range as the loss of the current vehicle damage assessment case.

For example, when assessing damage of a vehicle, highest loss of the plurality of similar cases obtained by the electronic device is C, and lowest loss of the plurality of similar cases obtained by the electronic device is D. The loss of the current vehicle damage assessment case is determined as being in a data range (D, C).

In other embodiments, the electronic device may also use other methods to estimate the loss of the current vehicle damage assessment case.

The electronic dev ice may assist in processing the current vehicle damage assessment case. Accordingly, labor costs are effectively saved and efficiency of case processing is improved.

At block 19, the electronic device outputs evaluated loss of the current vehicle damage assessment case.

According to the above embodiments, by utilizing the vehicle damage detection method based on image analysis, effectiveness of the vehicle damage detection is improved, and automatic evaluation of a loss can be achieved.

Figure 2:
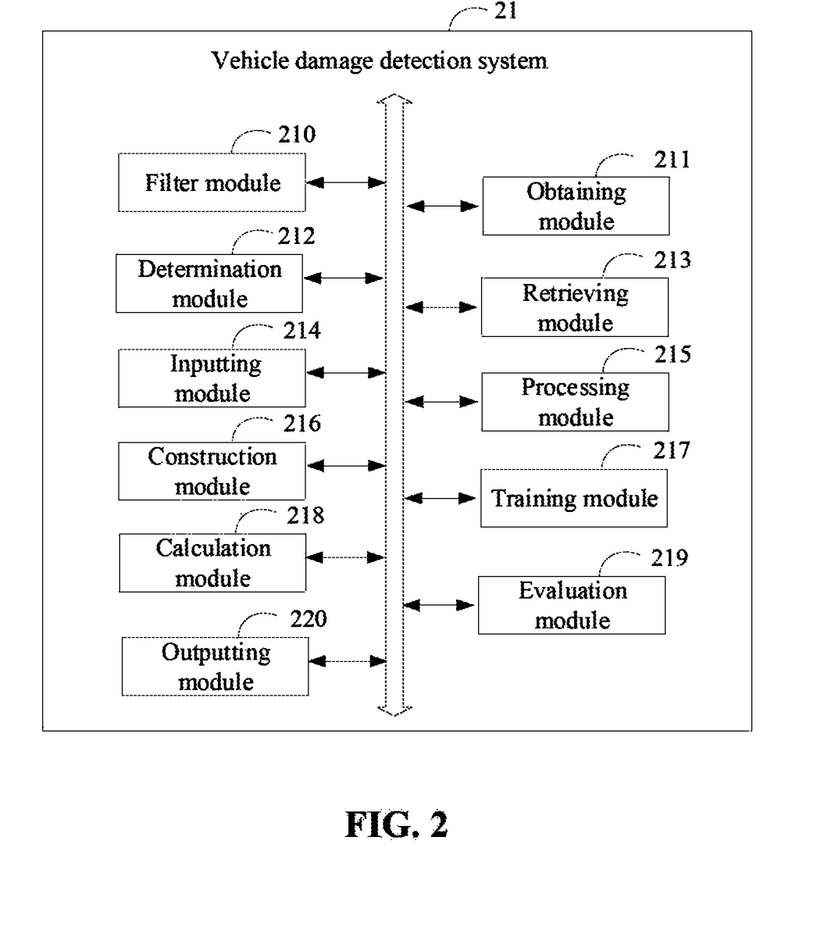
FIG. 2 is a block diagram of an embodiment of function modules of a vehicle damage detection system based on image analysis.

FIG. 2 is a block diagram of an embodiment of function modules of a vehicle damage detection system based on image analysis. The vehicle damage detection, system 21 includes a filter module 210, an obtaining module 211, a determination module 212, a retrieving module 213, an inputting module 214, a processing module 215, a construction module 216, a training module 217, a calculation module 218, an evaluation module 219, and an outputting module 220. The plurality of modules includes computerized instructions in a form of one or more computer-readable programs that can be stored in a non-transitory computer-readable medium (e.g., a memory of a computer device, for example, a memory 31 in FIG. 3), and is executed by at least one processor (e.g., a processor 32 in FIG. 3) of the electronic device to implement vehicle damage detection function (described in detail in FIG. 1).

In one embodiment, a user (e.g., a relevant staff member) may capture images at a scene where a current vehicle damage assessment case occurs, such as a traffic accident scene. The user may transmit the images to an electronic device including the vehicle damage detection system 21. In response to received images of the current vehicle damage assessment case, the filter module 210 obtains query images by filtering the received images using a pre-trained Single Shot MultiBox Detector (SSD) object detection model, the pre-trained SSD object detection model includes a vehicle damage component detection model and a vehicle damage classification model.

For example, in a vehicle damage assessment case, images are captured by an automobile risk assessment engineer or an inspector of a traffic accident, and then the images are transmitted to the electronic device for performing the vehicle damage detection method based on analysis of received images. In another example, a vehicle owner may invokes a vehicle risk determination application program in a mobile terminal, then the vehicle owner may take photos and upload the photos to be evidence according to requirement of vehicle insurance in the vehicle risk determination application program.

In one embodiment, each vehicle damage assessment case may include a plurality of images, such as more than 20 images.

In one embodiment, the received images further include an image of an identity of an owner of a vehicle, and an image of a vehicle identification number (VIN) code that indicates vehicle information. Images taken inside the vehicle may cause image quality to be low due to lighting problems. Such low-quality images may influence a detection result. Therefore, in order to eliminate interferences of irrelevant images, the received images need to be filtered.

In one embodiment, the filter module 210 may filter the received images using the pre-trained SSD object detection model.

After filtering, the number of the query images may be smaller than the number of the received images. For example, when the number of the received images is 20, the number of the query images may be 2-5. The number of the query images depends on a filtering result.

In one embodiment, a vehicle damaged component can be determined by the vehicle damage component detection model, and a vehicle damage type can be determined by the vehicle damage classification model.

The vehicle damage component detection model and the vehicle damage classification model may be SSD object detection models.

In one embodiment, output data of the vehicle damage component detection, model may include a name or an identifier of a vehicle damaged component, and output data of the vehicle damage classification model may include an identifier of a vehicle damage type.

The determination module 212 determines a vehicle damaged component in each of the query images according to the output data of the vehicle damage component detection model, and a vehicle damage type of each of the query images according to the output data of the vehicle damage classification model.

In one embodiment, a type of the vehicle damage component and a type of the vehicle damage type can be predefined or updated according to actual requirements.

For example, the vehicle damaged component can be classified into one or more of following categories, including a rear bumper, a rear cover, a front bumper, a front cover, a left rear door, a left rear fender, a left bottom, a left front door, a left front fender, a right rear door, a right rear fender, a right car bottom, a right front door, a right front fender, and a roof. The vehicle damage type can be further classified into predefined categories, including respraying, repairing, and renewing.

The retrieving module 213 retrieves candidate images according to the vehicle damaged component and the vehicle damage type of each of the query images.

In one embodiment, the retrieving module 213 may firstly generate a search vector according to the vehicle damaged component and the vehicle damage type of each of the query images, then the retrieving module 213 may retrieve the candidate images by performing a search in a configuration database using the search vector.

The configuration database may store images of all historical cases in relation to vehicle damage assessments.

The determination module 212 determines a feature vector of a candidate image corresponding to each of the query images.

In one embodiment, before determining the feature vector of the candidate image corresponding to each of the query images, the inputting module 214 inputs each candidate image into the residual network, and obtains a first vector of the each candidate image. Then the processing module 215 processes the first vector using a Transformer model, that is, the processing module 215 may encode the first vector using the Transformer model. The processing module 215 obtains the feature vector of the each candidate image, and stores the feature vector of the each candidate image into the configuration database.

According to the above embodiments, the processing module 215 directly stores the feature vector of the each candidate image in the configuration database, instead of only storing each candidate image. Thus the feature vector can be directly invoked when needed. Time consumption caused of regenerating the feature vector by data processing can be avoided every time the feature vector is used. Thus efficiency of vehicle damage detection based on image analysis can be improved.

The inputting module 214 inputs each of the query images into a residual network and obtains a feature vector of each of the query images.

In one embodiment, when the query images need to be recognized by a model, the query images may be converted into a vector form. The vector form is more advantageous for data processing.

In one embodiment, the residual network has a skip connection structure. Through the skip connection structure, a gradient can be better transmitted from an output to an input when training a model. Training of the model is easier, and training effect of a residual network model is better. Therefore, each of the query images may be processed using the residual network, and the feature vector of each of the query images may be obtained.

The processing module 215 obtains target output data by performing a codec procedure on the feature vector of each of the query images and the feature vector of the candidate image corresponding to each of the query images using a Transformer model.

Instead of separately processing the query images and the candidate image, the processing module 215 may comprehensively process the feature vector of each of the query images and the feature vector of the candidate image corresponding to each of the query images using the Transformer model, and obtain the target output data. Since environmental factors are fully taken into consideration, based on the target output data, related images more similar to the query images can be obtained to be similar images, and non-related images not similar to the query images can be removed. Accuracy of a result of the vehicle damage detection based on the image analysis is higher.

The processing module 215 obtains similar images of the query images by processing the target output data using a pre-trained similarity judgment model.

Since the number of the candidate images that are retrieved may be very large (e.g., tens, or hundreds), the processing module 215 needs to further filter the candidate images, and obtain candidate images, which are the most similar to each of the query images, as the similar images.

Specifically, the processing module 215 may process the target output data according to the similarity judgment model, and obtain the similar images of each of the query images. Thus, the similar images are more accurate, and redundant data with lower similarity is further eliminated.

In one embodiment, before processing the target output data using the pre-trained similarity judgment model, the training module 217 trains the similarity judgment model, according to a procedure as provided below.

The obtaining module 211 obtains training samples, and the construction module 216 constructs a plurality of sets of training data according to the training samples. The training module 217 obtains the similarity judgment model by training a prototype network based on a cross entropy loss function based on the plurality of sets of training data.

According to the above embodiments, the training module 217 may use the prototype network to obtain the similarity judgment model, and further determine the similar images of each of the query images.

Optionally, the training samples correspond to a plurality of vehicle damage types, each of the plurality of vehicle damage types corresponds to a plurality of images. In an example as provided below, the construction module 216 constructs the plurality of sets of training data according to the training samples.

The construction module 216 randomly selects a first preset number of vehicle damage types from the plurality of vehicle damage types to be target vehicle damage types, and constructs an initial image set based on images corresponding to the target vehicle damage types. For each of the target vehicle damage types, the construction module 216 randomly selects a second preset number of images from a plurality of images corresponding to each of the target vehicle damage types. The construction module 216 further obtains a candidate image set by integrating selected images, and excludes the candidate image set from the initial image set. Then, an image can be randomly acquired as a predicted image from the initial image set after excluding. In one embodiment, the image can be any image in the initial image set after excluding the candidate image set. The construction module 216 determines a combination of the predicted image and the candidate image set as a set of training data.

For example, when the training samples correspond to 90 vehicle damage types, and each of the 90 vehicle damage types includes at least 5 images, the construction module 216 randomly selects 20 vehicle damage types from the 90 vehicle damage types to be 20 target vehicle damage types. The construction module 216 constructs an initial image set based on images included in the 20 target vehicle damage types. Thus, the initial image set includes at least 100 images. For each of the target vehicle damage types, the construction module 216 may randomly select 4 images from the at least 5 images included in each of the target vehicle damage types. The construction module 216 integrates all selected images, and obtains a candidate image set having 80 images. In the initial image set that includes the at least 100 images, the construction module 216 may further randomly acquire any image as a predicted image from the initial image set, from which the 80 images of the candidate image set are excluded. The construction module 216 may determine a combination of the predicted image and the candidate image set as a set of training data.

During training, the training module 217 may determine a distance between a feature vector of the predicted image and a feature vector of each of the target vehicle damage types, and a vehicle damage level of the predicted image.

In one embodiment, the determination module 212 determines a feature vector of each image in the second preset number of images corresponding to each of the target vehicle damage types. The calculation module 218 calculates a vector sum of the feature vector of each image, and obtains a feature vector of each of the target vehicle damage types. The determination module 212 determines a feature vector of the predicted image, and the calculation module 218 calculates a distance between the feature vector of the predicted image and the feature vector of each of the target vehicle damage types. The determination module 212 determines a target vehicle damage level corresponding to a minimum distance to be a vehicle damage level of the predicted image.

Specifically, the distance may include, but is not limited to, Euclidean distance and cosine distance, etc.

For example, in the candidate image set, the determination module 212 determines a feature vector of each of the 4 images included in each of the target vehicle damage types. The calculation module 218 calculates a vector sum of the feature vector of each image, and obtains a feature vector of each of the target vehicle damage types. The determination module 212 further determines a feature vector of the predicted image, and the calculation module 218 calculates a distance between the feature vector of the predicted image and the feature vector of each of the target vehicle damage types. The determination module 212 determines a target vehicle damage level corresponding to a minimum distance to be a vehicle damage level of the predicted image.

In one embodiment as provided below, the processing module 215 obtains the similar images of the query images by processing the target output data using the pre-trained similarity judgment model.

For each of the query images, the processing module 215 obtains a first embedded vector of the query image from the target output data, and a second embedded vector of the candidate image corresponding to the query image. The processing module 215 calculates a distance between the first embedded vector and each second embedded vector, and determines candidate images those have second embedded vectors corresponding to a minimum distance, as the similar mages of the query images.

According to the above embodiment, the processing module 215 can determine the similar image of each of the query images based on the distance.

The determination module 212 determines similar cases of the current vehicle damage assessment case using the similar images.

In one embodiment, the similar cases represent cases those are similar in attributes of the current vehicle damage assessment case, the similar cases and the current vehicle damage assessment case have the same values of a predetermined number of attributes. Based on the similar cases, a current solution of the current vehicle damage assessment case can be determined.

In one embodiment, the determination module 212 determines a vehicle damage assessment case corresponding to each of the candidate images, and calculates the number of candidate images corresponding to each vehicle damage assessment case.

In one embodiment, the determination module 212 determines vehicle damage assessment cases corresponding to a maximum number, to be the similar cases of the current vehicle damage assessment case.

In response that there are a plurality of vehicle damage assessment cases having a same number, the determination module 212 calculates a sum of distances between the candidate images of each vehicle damage assessment case and a corresponding query image, and determines a vehicle damage assessment case corresponding to a minimum sum to be the similar cases of the current vehicle damage assessment case.

The above embodiment actually adopts an idea of a voting method, which is equivalent to taking one vote for each candidate image. Cases with a largest number of votes can be further determined to be the similar cases of the current vehicle damage assessment case. When there are a plurality of vehicle damage assessment cases having same number of votes, the determination module 212 may determine vehicle damage assessment case corresponding to a minimum sum to be the similar cases of the current vehicle damage assessment case, to improve accuracy.

The evaluation module 219 evaluates loss of the current vehicle damage assessment case based on the similar cases.

In one embodiment, the evaluation module 219 evaluates the loss of the current vehicle damage assessment case based on the similar cases by utilizing, a combination of one or more of the following means:

In response that there is one similar case, the evaluation module 219 determines loss of the one similar case to be loss of the current vehicle damage assessment case.

For example, when assessing damage of a vehicle, the evaluation module 219 may directly determine the loss of the one similar case to be the loss of the current vehicle damage assessment case.

In response that there are a plurality of similar cases, the evaluation module 219 obtains loss of each of the plurality of similar cases, and calculates an average value of obtained loss to be the loss of the current vehicle damage assessment case.

For example, when assessing damage of a vehicle, the evaluation module 219 may calculate an average value of the loss of each of the plurality of similar cases, and determine the average value to be the loss of the current vehicle damage assessment case.

In response that there are the plurality of similar cases, the evaluation module 219 obtains the loss of each of the plurality of similar cases and a weight of each of the plurality of similar cases. The evaluation module 219 calculates a weighted sum of the loss of each of the plurality of similar cases, and determines the weight of each of the plurality of similar cases to be the loss of the current vehicle damage assessment case.

For example, when assessing damage of a vehicle, a weight of a similar case A is x, loss of the similar case A is y, a weight of a similar case B is m, and loss of the similar case B is n, then loss of the current vehicle damage assessment case is xy+mn.

In response that there are the plurality of similar cases, the evaluation module 219 obtains the loss of each of the plurality of similar cases. The evaluation module 219 further obtains maximum loss and minimum loss, and determines a data range to be the loss of the current vehicle damage assessment case.

For example, when assessing damage of a vehicle, highest loss of the plurality of similar cases obtained by the evaluation module 219 is C, and lowest loss of the plurality of similar cases obtained by the electronic device is D, then the loss of the current vehicle damage assessment case can be determined to be in a data range (D, C).

In other embodiments, the evaluation module 219 may also use other methods to estimate the loss of the current vehicle damage assessment case.

The evaluation module 219 may assist in processing the current vehicle damage assessment case. Accordingly, labor costs are effectively saved and efficiency of cases processing is improved.

The outputting module 220 outputs evaluated loss of the current vehicle damage assessment case.

According to the above embodiments, by utilizing the vehicle damage detection method based on image analysis, effectiveness of the vehicle damage detection is improved, and automatic evaluation of a loss is further realized.

Figure 3:
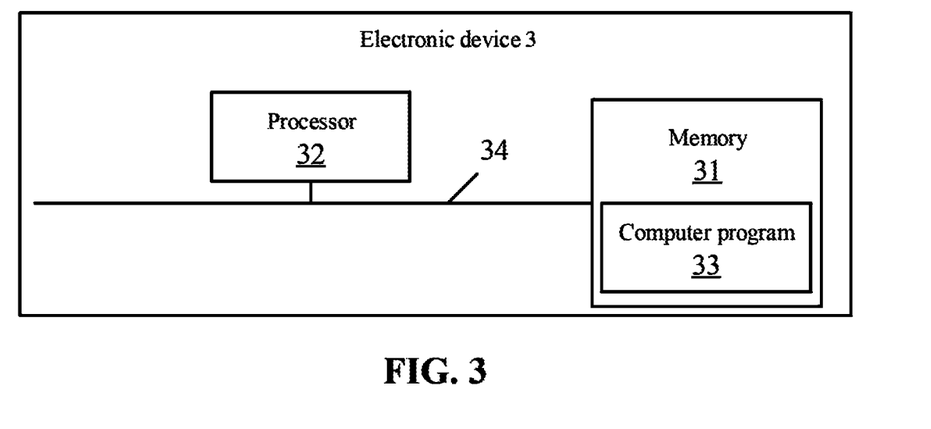
FIG. 3 is a block diagram of an embodiment of an electronic device that executes the vehicle damage detection method based on image analysis.

FIG. 3 is a block diagram of an embodiment of an electronic device that executes the vehicle damage detection method based on image analysis.

The electronic device 3 includes a memory 31, at least one processor 32, a computer program 33 stored in the memory 31 and operable on the at least one processor 32, and at least one communication bus 34.

It will be understood by those skilled in the art that FIG. 3 is merely showing an example of the electronic device 3, it does not constitute a limitation on the electronic device 3, it may include more or less components than those illustrated, or may combine certain components, or have different components. The electronic device 3 may also include input and output devices, network access devices, and the like.

The at least one processor 32 may be a central processing unit (CPU), or may be another general-purpose processor, a digital signal processor (DSP), or an application specific integrated circuit (ASIC), a Field-Programmable Gate Array (FPGA) or other programmable logic device, discrete gate or transistor logic device, discrete hardware components, and the like. The at least one processor 32 may be a microprocessor or any conventional processor or the like. The at least one processor 32 is a control center of the electronic device 3, and connects various parts of the entire electronic device 3 by using various interfaces and lines.

The memory 31 can be used to store the computer program 33 and/or modules/modules by running or executing computer programs. The data within the memory 31 implements various functions of the electronic device 3. The memory 31 may mainly include a storage program area and a storage data area, wherein the storage program area may store an operating system, an application required for at least one function (such as a sound playing function, an image playing function, etc.), and the like. Data created by use of the electronic device 3 is also stored. In addition, the memory 31 may include a non-volatile memory such as a hard disk, a memory, a plug-in hard disk, a smart memory card (SMC), and a secure digital (SD) card, flash card, at least one disk memory, flash device, or other non-volatile solid state memory.

Combined with FIG. 1, the memory 31 in the electronic device 3 stores a plurality of instructions to implement the vehicle damage detection method based on image analysis. When the memory 31 is executed by the at least one processor 32, the at least one processor 32 is caused to respond to received images of a current vehicle damage assessment case, and obtain query images by filtering the received images using a pre-trained Single Shot MultiBox Detector (SSD) object detection model, the pre-trained SSD object detection model includes a vehicle damage component detection model and a vehicle damage classification model, and determine a vehicle damaged component in each of the query images according to output data of the vehicle damage component detection model, and a vehicle damage type of each of the query images according to output data of the vehicle damage classification model. The at least one processor 32 is further caused to retrieve candidate images according to the vehicle damaged component and the vehicle damage type of each of the query images, and determine a feature vector of a candidate image corresponding to each of the query images. The at least one processor 32 is further caused to input each of the query images into a residual network and obtain a feature vector of each of the query images, and obtain target output data by performing a codec procedure on the feature vector of each of the query images and the feature vector of the candidate image corresponding to each of the query images using a Transformer model. The at least one processor 32 is further caused to obtain similar images of the query images by processing the target output data using a pre-trained similarity judgment model, and determine similar cases of the current vehicle damage assessment case using the similar images. The at least one processor 32 is further caused to evaluate loss of the current vehicle damage assessment case based on the similar cases, and output evaluated loss of the current vehicle damage assessment case.

In at least one embodiment, the at least one processor 32 may further obtain training samples, and construct a plurality of sets of training data according to the training samples. Then the at least one processor 32 may further obtain the similarity judgment model by training a prototype network based on a cross entropy loss function using the plurality of sets of training data.

In at least one embodiment, the training samples correspond to a plurality of vehicle damage types, each of the plurality of vehicle damage types corresponds to a plurality of images, the at least one processor 32 may further randomly select a first preset number of vehicle damage types from the plurality of vehicle damage types to be target vehicle damage types, and construct an initial image set based on images corresponding to the target vehicle damage types. For each of the target vehicle damage types, the at least one processor 32 may randomly select a second preset number of images from a plurality of images corresponding to each of the target vehicle damage types, and obtain a candidate image set by integrating selected images. The at least one processor 32 may further exclude the candidate image set from the initial image set, and randomly acquire any image as a predicted image from the initial image set after excluding, and determine a combination of the predicted image and the candidate image set as a set of training data.

In at least one embodiment, the at least one processor 32 may further determine a feature vector of each image in the second preset number of images corresponding to each of the target vehicle damage types, and calculate a vector sum of the feature vector of each image and obtain a feature vector of each of the target vehicle damage types. The at least one processor 32 may further determine a feature vector of the predicted image, and calculate a distance between the feature vector of the predicted image and the feature vector of each of the target vehicle damage types. The at least one processor 32 may further determine a target vehicle damage level corresponding to a minimum distance to be a vehicle damage level of the predicted image.

In at least one embodiment, the at least one processor 32 may further: for each of the query images, obtain a first embedded vector of the query image from the target output data, and obtain a second embedded vector of the candidate image corresponding to the query image, and calculate a distance between the first embedded vector and each second embedded vector. The at least one processor 32 may further determine candidate images those have second embedded vectors corresponding to a minimum distance, as the similar images of the query images.

In at least one embodiment, the at least one processor 32 may further determine a vehicle damage assessment case corresponding to each of the candidate images, and calculate the number of candidate images corresponding to each vehicle damage assessment case. The at least one processor 32 may further determine vehicle damage assessment cases corresponding to a maximum number, to be the similar cases of the current vehicle damage assessment case, or in response that there are a plurality of vehicle damage assessment cases having a same number, calculate a sum of distances between the candidate images of each vehicle damage assessment case and a corresponding query image, and determine a vehicle damage assessment case corresponding to a minimum sum to be the similar cases of the current vehicle damage assessment case.

In at least one embodiment, in response that there is one similar case, the at least one processor 32 may further determine loss of the one similar case to be loss of the current vehicle damage assessment case.

In response that there are a plurality of similar cases, the at least one processor 32 is caused to obtain loss of each of the plurality of similar cases, and calculate an average value of obtained loss as the loss of the current vehicle damage assessment case, or obtain the loss of each of the plurality of similar cases and a weight of each of the plurality of similar cases, calculate a weighted sum of the loss of each of the plurality of similar cases and the weight of each of the plurality of similar cases as the loss of the current vehicle damage assessment case, or obtain the loss of each of the plurality of similar cases, obtain maximum loss and minimum loss, and determine a data range as the loss of the current vehicle damage assessment case.

For details, refer to the description of the related steps in the corresponding embodiment of FIG. 1 for the specific implementation of the above-mentioned instructions by the at least one processor 32 is previously given.

The modules integrated in the electronic device 3, when implemented in the form of software functional modules as separate products, may be stored in a computer readable storage medium. Based on such understanding, the present disclosure implements all or part of the processes in the foregoing embodiments, and may also be completed by a computer program to instruct related hardware. The computer program may be stored in a computer readable storage medium. The methods of the various embodiments described above may be implemented when the program is executed by the processor. The computer program includes computer program codes, which may be in the form of source code, object code form, executable file, or some intermediate form. The computer readable medium may include any entity or device capable of carrying out the computer program codes, such as a recording medium, a USB flash drive, a removable hard disk, a magnetic disk, an optical disk, a computer memory, and a read-only memory (ROM).

In the several embodiments provided by the present disclosure, it should be understood that the disclosed system, apparatus, and method may be implemented in other manner. For example, the device embodiments described above are merely illustrative. For example, the division of the modules is only a logical function division, and the actual implementation may have another manner of division.

The modules described as separate components may or may not be physically separated, and the components displayed as modules may or may not be physical modules, that is, may be located in one place, or may be distributed in multiple network modules. Some or all of the modules may be selected according to actual needs to achieve the purpose of the disclosure.

In addition, each functional module in each embodiment of the present disclosure may be integrated into one processing unit, or each unit may exist as a standalone unit, or two or more modules may be integrated into one unit. The above integrated unit can be implemented in the form of hardware or in the form of hardware plus software function modules.

It is apparent to those skilled in the art that the present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims instead all changes in the meaning and scope of equivalent elements are included in the present disclosure. Any accompanying drawings in the claims should not be construed as limiting the claim. In addition, it is to be understood that the word "including" does not exclude other elements or steps. A plurality of modules or devices recited in the system claims can also be implemented by a unit or device by software or hardware. The particular ordering of words does not denote any particular order.

It should be noted that the above embodiments are only for explaining the technical solutions of the present disclosure and are not intended to be limiting, and the present disclosure describes preferred embodiments. Modifications or equivalents can be made without departing from the spirit and scope of the present disclosure.

We claim:

1. A vehicle damage detection method based on image analysis, the method comprising:
   in response to received images of a current vehicle damage assessment case, obtaining query images by filtering the received images using a pre-trained Single Shot MultiBox Detector (SSD) object detection model, the pre-trained SSD object detection model comprising a vehicle damage component detection model and a vehicle damage classification model;
   determining a vehicle damaged component in each of the query images according to output data of the vehicle damage component detection model, and a vehicle damage type of each of the query images according to output data of the vehicle damage classification model;
   retrieving candidate images according to the vehicle damaged component and the vehicle damage type of each of the query images;
   determining a feature vector of each of the candidate images corresponding to each of the query images;
   inputting each of the query images into a residual network and obtaining a feature vector of each of the query images;
   obtaining target output data by performing a codec procedure on the feature vector of each of the query images and the feature vector of each of the candidate images corresponding to each of the query images using a Transformer model;
   obtaining similar images of the query images by processing the target output data using a pre-trained similarity judgment model, comprising: for each of the query images, obtaining a first embedded vector of the query image from the target output data, and a second embedded vector of the candidate image corresponding to the query image; calculating a distance between the first embedded vector and each second embedded vector; and determining candidate images those have second embedded vectors corresponding to a minimum distance, as the similar images of the query image;
   determining similar cases of the current vehicle damage assessment case using the similar images;
   evaluating loss of the current vehicle damage assessment case based on the similar cases;
   outputting evaluated loss of the current vehicle damage assessment case.

2. The vehicle damage detection method based on image analysis according to claim 1, further comprising:
- obtaining training samples;
- constructing a plurality of sets of training data according to the training samples;
- obtaining the similarity judgment model by training a prototype network based on a cross entropy loss function using the plurality of sets of training data.

3. The vehicle damage detection method based on image analysis according to claim 2, wherein the training samples correspond to a plurality of vehicle damage types, each of the plurality of vehicle damage types corresponds to a plurality of images, and the plurality of sets of the training data are constructed according to the training samples by:
- randomly selecting a first preset number of vehicle damage types from the plurality of vehicle damage types to be target vehicle damage types;
- constructing an initial image set based on images corresponding to the target vehicle damage types;
- for each of the target vehicle damage types, randomly selecting a second preset number of images from a plurality of images corresponding to each of the target vehicle damage types;
- obtaining a candidate image set by integrating selected images;
- excluding the candidate image set from the initial image set;
- randomly acquiring any image as a predicted image from the initial image set after excluding;
- determining a combination of the predicted image and the candidate image set as a set of training data.

4. The vehicle damage detection method based on image analysis according to claim 3, further comprising:
- determining a feature vector of each image in a second preset number of images corresponding to each of the target vehicle damage types;
- calculating a vector sum of the feature vector of each image and obtaining a feature vector of each of the target vehicle damage types;
- determining a feature vector of the predicted image;
- calculating a distance between the feature vector of the predicted image and the feature vector of each of the target vehicle damage types;
- determining a target vehicle damage level corresponding to a minimum distance to be a vehicle damage level of the predicted image.

5. The vehicle damage detection method based on image analysis according to claim 1, wherein determining the similar cases of the current vehicle damage assessment case using the similar images comprises:
- determining a vehicle damage assessment case corresponding to each of the candidate images;
- calculating a number of candidate images corresponding to each vehicle damage assessment case;
- determining vehicle damage assessment cases corresponding to a maximum number, to be the similar cases of the current vehicle damage assessment case; or
- in response that there are a plurality of vehicle damage assessment cases having a same number, calculating a sum of distances between the candidate images of each vehicle damage assessment case and a corresponding query image, and determining a vehicle damage assessment case corresponding to a minimum sum to be the similar cases of the current vehicle damage assessment case.

6. The vehicle damage detection method based on image analysis according to claim 1:
- in response that there is one similar case, wherein the method further comprises:
- determining loss of the one similar case to be loss of the current vehicle damage assessment case; or
- in response that there are a plurality of similar cases, wherein the method further comprises:
- obtaining loss of each of the plurality of similar cases, calculating an average value of the obtained loss as the loss of the current vehicle damage assessment case; or
- obtaining the loss of each of the plurality of similar cases and a weight of each of the plurality of similar cases, calculating a weighted sum of the loss of each of the plurality of similar cases and the weight of each of the plurality of similar cases as the loss of the current vehicle damage assessment case; or
- obtaining the loss of each of the plurality of similar cases, obtaining maximum loss and minimum loss, and determining a data range as the loss of the current vehicle damage assessment case.

7. An electronic device, comprising:
- at least one processor; and
- a memory storing a plurality of instructions, which when executed by the processor, causes the at least one processor to:
- in response to received images of a current vehicle damage assessment case, obtain query images by filtering the received images using a pre-trained Single Shot MultiBox Detector (SSD) object detection model, the pre-trained SSD object detection model comprising a vehicle damage component detection model and a vehicle damage classification model;
- determine a vehicle damaged component in each of the query images according to output data of the vehicle damage component detection model, and a vehicle damage type of each of the query images according to output data of the vehicle damage classification model;
- retrieve candidate images according to the vehicle damaged component and the vehicle damage type of each of the query images;
- determine a feature vector of each of the candidate images corresponding to each of the query images;
- input each of the query images into a residual network and obtain a feature vector of each of the query images;
- obtain target output data by performing a codec procedure on the feature vector of each of the query images and the feature vector of each of the candidate images corresponding to each of the query images using a Transformer model;
- obtain similar images of the query images by processing the target output data using a pre-trained similarity judgment model, comprising: for each of the query images, obtaining a first embedded vector of the query image from the target output data, and a second embedded vector of the candidate image corresponding to the query image; calculating a distance between the first embedded vector and each second embedded vector; and determining candidate images those have second embedded vectors corresponding to a minimum distance, as the similar images of the query image;
- determine similar cases of the current vehicle damage assessment case using the similar images;
- evaluate loss of the current vehicle damage assessment case based on the similar cases;
- output evaluated loss of the current vehicle damage assessment case.

8. The electronic device according to claim 7, wherein the at least one processor is further caused to:

obtain training samples;
construct a plurality of sets of training data according to the training samples;
obtain the similarity judgment model by training a prototype network based on a cross entropy loss function using the plurality of sets of training data.

9. The electronic device according to claim 8, wherein the training samples correspond to a plurality of vehicle damage types, each of the plurality of vehicle damage types corresponds to a plurality of images, wherein the at least one processor is further caused to:
randomly select a first preset number of vehicle damage types from the plurality of vehicle damage types to be target vehicle damage types;
construct an initial image set based on images corresponding to the target vehicle damage types;
for each of the target vehicle damage types, randomly select a second preset number of images from a plurality of images corresponding to each of the target vehicle damage types;
obtain a candidate image set by integrating selected images;
exclude the candidate image set from the initial image set;
randomly acquire any image as a predicted image from the initial image set after excluding;
determine a combination of the predicted image and the candidate image set as a set of training data.

10. The electronic device according to claim 9, wherein the at least one processor is further caused to:
determine a feature vector of each image in a second preset number of images corresponding to each of the target vehicle damage types;
calculate a vector sum of the feature vector of each image and obtain a feature vector of each of the target vehicle damage types;
determine a feature vector of the predicted image;
calculate a distance between the feature vector of the predicted image and the feature vector of each of the target vehicle damage types;
determine a target vehicle damage level corresponding to a minimum distance to be a vehicle damage level of the predicted image.

11. The electronic device according to claim 7, wherein the at least one processor is further caused to:
determine a vehicle damage assessment case corresponding to each of the candidate images;
calculate a number of candidate images corresponding to each vehicle damage assessment case;
determine vehicle damage assessment cases corresponding to a maximum number, to be the similar cases of the current vehicle damage assessment case; or
in response that there are a plurality of vehicle damage assessment cases having a same number, calculate a sum of distances between the candidate images of each vehicle damage assessment case and a corresponding query image, and determine a vehicle damage assessment case corresponding to a minimum sum to be the similar cases of the current vehicle damage assessment case.

12. The electronic device f according to claim 7:
in response that there is one similar case, wherein the at least one processor is further caused to:
determine loss of the one similar case to be loss of the current vehicle damage assessment case; or
in response that there are a plurality of similar cases, wherein the at least one processor is further caused to:
obtain loss of each of the plurality of similar cases, calculate an average value of obtained loss as the loss of the current vehicle damage assessment case; or
obtain the loss of each of the plurality of similar cases and a weight of each of the plurality of similar cases, calculate a weighted sum of the loss of each of the plurality of similar cases and the weight of each of the plurality of similar cases as the loss of the current vehicle damage assessment case; or
obtain the loss of each of the plurality of similar cases, obtain maximum loss and minimum loss, and determine a data range as the loss of the current vehicle damage assessment case.

13. A non-transitory storage medium having stored thereon instructions that, when executed by a processor of an electronic device, causes the processor of the electronic device to perform a vehicle damage detection method based on image analysis, the method comprising:
in response to received images of a current vehicle damage assessment case, obtaining query images by filtering the received images using a pre-trained Single Shot MultiBox Detector (SSD) object detection model, the pre-trained SSD object detection model comprising a vehicle damage component detection model and a vehicle damage classification model;
determining a vehicle damaged component in each of the query images according to output data of the vehicle damage component detection model, and a vehicle damage type of each of the query images according to output data of the vehicle damage classification model;
retrieving candidate images according to the vehicle damaged component and the vehicle damage type of each of the query images;
determining a feature vector of each of the candidate images corresponding to each of the query images;
inputting each of the query images into a residual network and obtaining a feature vector of each of the query images;
obtaining target output data by performing a codec procedure on the feature vector of each of the query images and the feature vector of each of the candidate images corresponding to each of the query images using a Transformer model;
obtaining similar images of the query images by processing the target output data using a pre-trained similarity judgment mode, comprising: for each of the query images, obtaining a first embedded vector of the query image from the target output data, and a second embedded vector of the candidate image corresponding to the query image; calculating a distance between the first embedded vector and each second embedded vector; and determining candidate images those have second embedded vectors corresponding to a minimum distance, as the similar images of the query image 1;
determining similar cases of the current vehicle damage assessment case using the similar images;
evaluating loss of the current vehicle damage assessment case based on the similar cases;
outputting evaluated loss of the current vehicle damage assessment case.

14. The non-transitory storage medium according to claim 13, the method further comprising:
obtaining training samples;
constructing a plurality of sets of training data according to the training samples;

obtaining the similarity judgment model by training a prototype network based on a cross entropy loss function using the plurality of sets of training data.

15. The non-transitory storage medium according to claim 14, wherein the training samples correspond to a plurality of vehicle damage types, each of the plurality of vehicle damage types corresponds to a plurality of images, and the plurality of sets of the training data are constructed according to the training samples by:

randomly selecting a first preset number of vehicle damage types from the plurality of vehicle damage types to be target vehicle damage types;

constructing an initial image set based on images corresponding to the target vehicle damage types;

for each of the target vehicle damage types, randomly selecting a second preset number of images from a plurality of images corresponding to each of the target vehicle damage types;

obtaining a candidate image set by integrating selected images;

excluding the candidate image set from the initial image set;

randomly acquiring any image as a predicted image from the initial image set after excluding;

determining a combination of the predicted image and the candidate image set as a set of training data.

16. The non-transitory storage medium according to claim 15, the method further comprising:

determining a feature vector of each image in a second preset number of images corresponding to each of the target vehicle damage types;

calculating a vector sum of the feature vector of each image and obtaining a feature vector of each of the target vehicle damage types;

determining a feature vector of the predicted image;

calculating a distance between the feature vector of the predicted image and the feature vector of each of the target vehicle damage types;

determining a target vehicle damage level corresponding to a minimum distance to be a vehicle damage level of the predicted image.

17. The non-transitory storage medium according to claim 13, wherein determining the similar cases of the current vehicle damage assessment case using the similar images comprises:

determining a vehicle damage assessment case corresponding to each of the candidate images;

calculating a number of candidate images corresponding to each vehicle damage assessment case;

determining vehicle damage assessment cases corresponding to a maximum number, to be the similar cases of the current vehicle damage assessment case; or     in response that there are a plurality of vehicle damage assessment cases having a same number, calculating a sum of distances between the candidate images of each vehicle damage assessment case and a corresponding query image, and determining a vehicle damage assessment case corresponding to a minimum sum to be the similar cases of the current vehicle damage assessment case.

* * * * *